United States Patent
Yao

(10) Patent No.: US 12,095,297 B2
(45) Date of Patent: Sep. 17, 2024

(54) ELECTRICITY TRADING DEVICE AND ELECTRICALLY-OPERATED APPARATUS USING SAME

(71) Applicant: Li-Ho Yao, Taipei (TW)

(72) Inventor: Li-Ho Yao, Taipei (TW)

( * ) Notice: Subject to any disclaimer, the term of this patent is extended or adjusted under 35 U.S.C. 154(b) by 213 days.

(21) Appl. No.: 17/706,602

(22) Filed: Mar. 29, 2022

(65) Prior Publication Data

US 2022/0320883 A1    Oct. 6, 2022

(30) Foreign Application Priority Data

Mar. 31, 2021 (TW) ................. 110111957

(51) Int. Cl.
*H02J 7/00* (2006.01)
*G06Q 40/04* (2012.01)
*H04B 5/79* (2024.01)
*H05K 5/00* (2006.01)

(52) U.S. Cl.
CPC ............ *H02J 7/0045* (2013.01); *G06Q 40/04* (2013.01); *H05K 5/0017* (2013.01); *H04B 5/79* (2024.01)

(58) Field of Classification Search
CPC .... H02J 7/0045; H02J 7/00032; H02J 7/0063; H02J 7/0029; H02J 7/0047; H02J 2207/20; G06Q 40/04; G06Q 30/0645; G06Q 50/06; G06Q 20/3278; G06Q 30/0226; G06Q 50/30; H05K 5/0017; H04B 5/0037; H01M 10/425; H01M 10/44; H01M 10/488; H01M 2010/4278; H01M 2220/20; B60L 53/305; B60L 53/66; B60L 53/665; B62M 6/90; H02M 3/1582
USPC ............................................... 361/37
See application file for complete search history.

(56) References Cited

U.S. PATENT DOCUMENTS

| | | | |
|---|---|---|---|
| 2008/0174278 A1* | 7/2008 | Masias | H02J 1/10 320/138 |
| 2008/0231226 A1* | 9/2008 | Hoffman | H02J 7/34 320/128 |
| 2013/0106341 A1* | 5/2013 | Eaton | H01M 10/441 320/167 |
| 2015/0102667 A1* | 4/2015 | Zhao | B60L 58/20 307/10.1 |
| 2019/0061541 A1* | 2/2019 | Penilla | H04L 67/303 |
| 2019/0280343 A1* | 9/2019 | Wang | B60L 53/65 |

FOREIGN PATENT DOCUMENTS

WO    WO-2020156771 A1 *  8/2020  ............. B60L 50/60

* cited by examiner

*Primary Examiner* — Thienvu V Tran
*Assistant Examiner* — Sreeya Sreevatsa
(74) *Attorney, Agent, or Firm* — Leong C. Lei

(57) ABSTRACT

An electricity trading device at least includes a device body and a transaction circuit arranged in the device body, so that connection is made through the transaction circuit to a portable energy storage device and a primary battery, and electricity transfer and trading is conducted with the transaction circuit. As such, the charging frequency and the number of removal/insertion operations of the primary battery are reduced to effectively extend the service life thereof and also to prosper the green energy industry for realizing sharing economy of electricity market.

9 Claims, 5 Drawing Sheets

ELECTRICITY TRADING DEVICE AND ELECTRICALLY-OPERATED APPARATUS USING SAME

TECHNICAL FIELD OF THE INVENTION

The present invention relates generally to a field of trading technology for electricity sharing economy, and more particularly to an electricity trading device that combines electricity transfer and electricity coin transaction.

DESCRIPTION OF THE PRIOR ART

Electrical vehicles use a motor that acquires energy from a battery to serve as a drive unit. The battery so operated constantly consumes electricity stored therein, so that repeated recharging is necessary. This increases the frequency of recharging, leading to fast damage of the battery and shortening of the service life thereof.

Further, most of the electrical vehicles adopt battery exchange for reducing the waiting time for battery charging. This requires frequent removal and insertion of the battery and would eventually result in damage of battery connectors. This shortens the service lives of the battery and the connector, and may even cause issue of driving safety due to poor contact resulting from connection loosening during driving of the vehicle.

In fact, the acquisition and supply of green energy have been greatly improved, and this increases the interests of homes and industries for using the green energy. Individuals, homes, and small businesses, which will be collectively referred to as individual entities, are starting to invest in the green energy business.

Allowing the green energy produced by the individual entities to be put into use through establishing a direct and simple exchange and trading model would make the green energy business popularized among the small entities to eventually resolve the above issue and also to effectively create and prosper the green energy business, allowing for sharing economy of green energy.

SUMMARY OF THE INVENTION

The primary objective of the present invention is to help reduce a recharging frequency and a count of removal/insertion of a primary battery, in order to effectively protect the primary battery and thereby extend the service life of the primary battery.

Another objective of the present invention is to allow an average individual to do trading with electricity in order to prosper the green energy business and to enable effective utilization of green energy for all people and to create sharing economy for the electricity market to thereby resolve the issue of energy shortage and to revitalize the economics.

DETAILED DESCRIPTION OF THE PREFERRED EMBODIMENT

Figure 1:
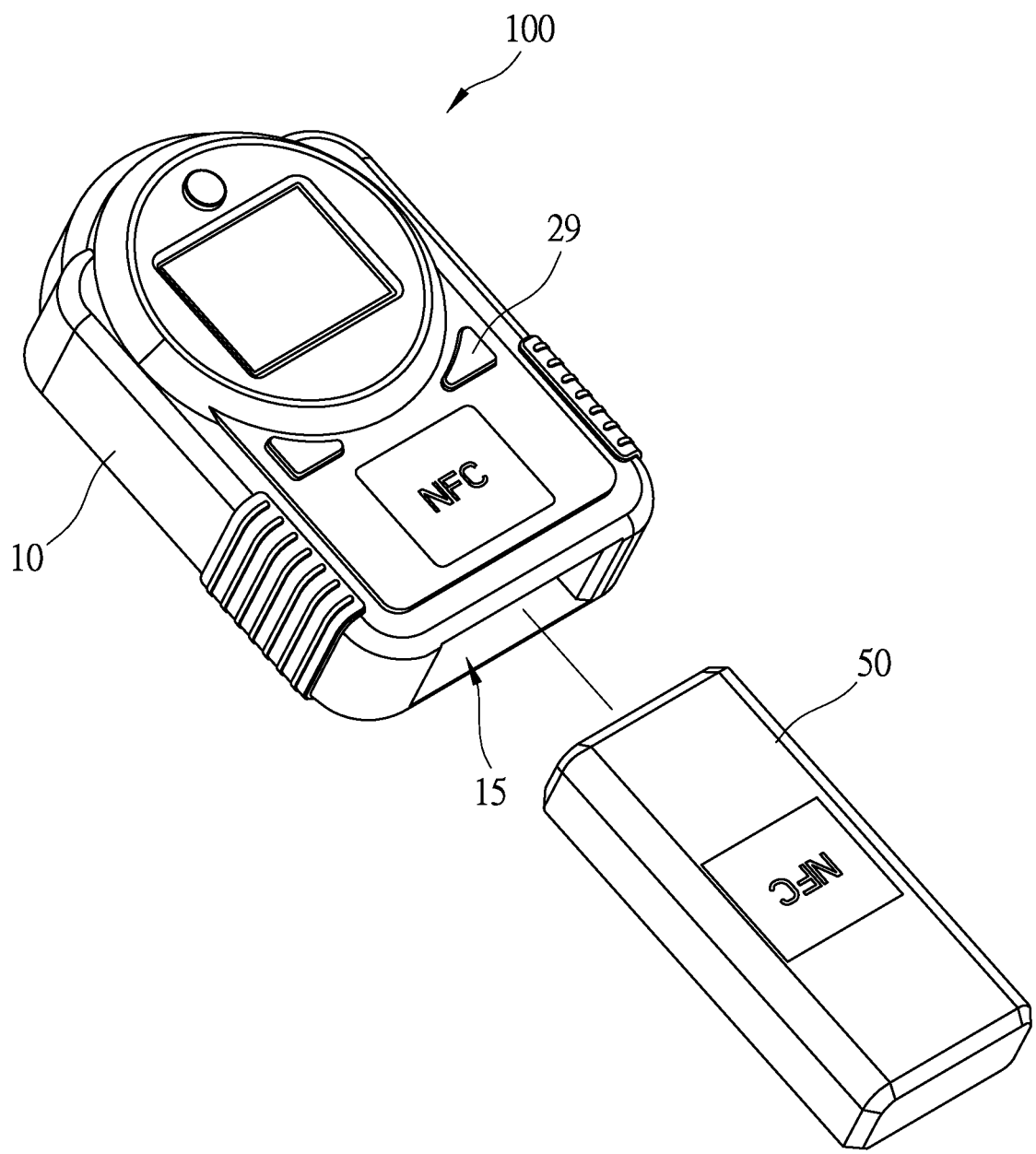
FIG. 1 is a perspective view showing an electricity trading device according to the present invention.
Figure 2:
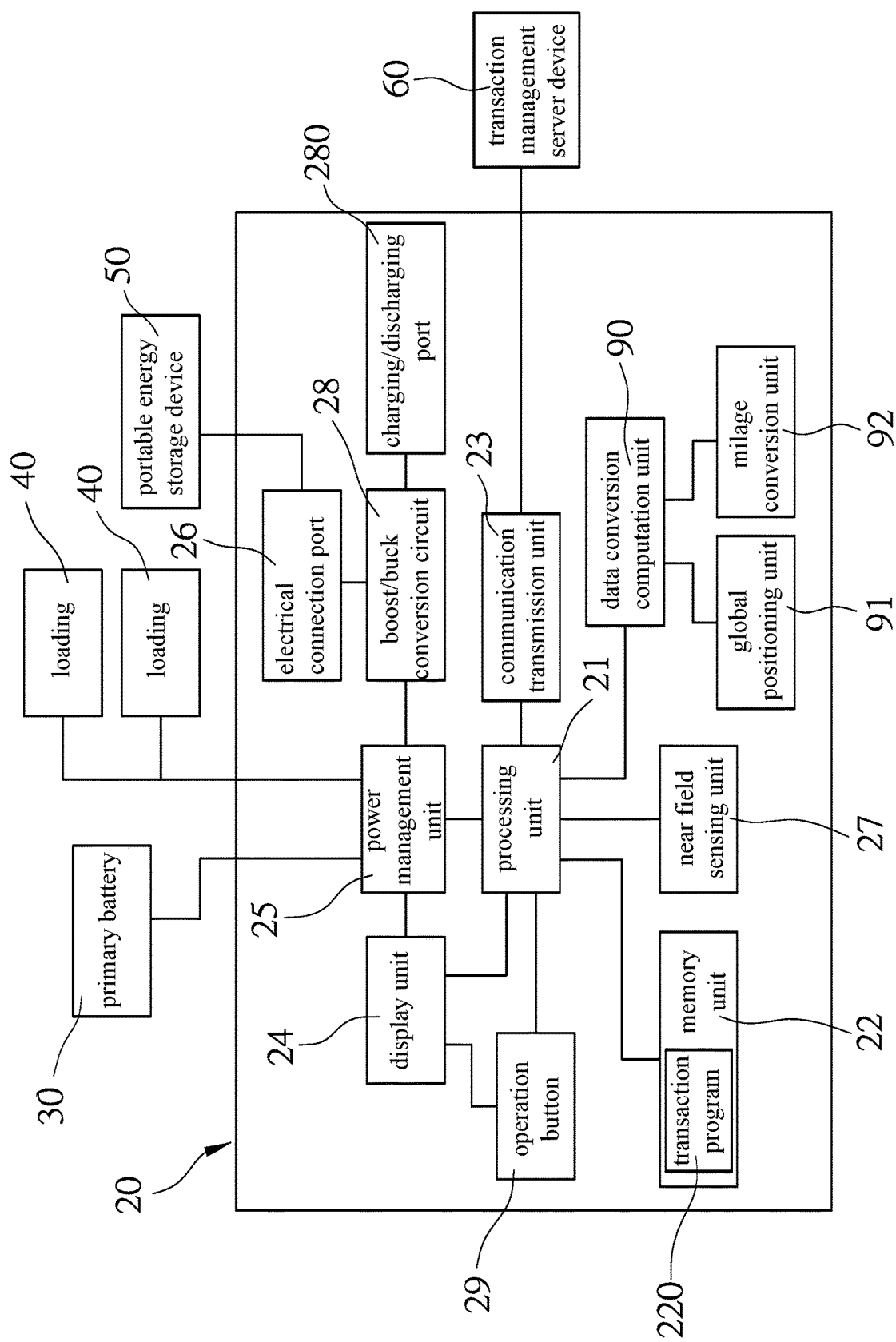
FIG. 2 is a schematic view showing circuit architecture of the electricity trading device according to the present invention.

The present invention provides an electricity trading device, of which structure details are illustrated in FIGS. 1 and 2. The electricity trading device 100 comprises a device body 10 and a transaction circuit 20, wherein the transaction circuit 20 is arranged in the device body 10.

Further, the device body 10 comprises an insertion receptacle 15, into which a portable energy storage device 50 is selectively inserted to allow the portable energy storage device 50 to establish electrical connection with the transaction circuit 20, so that the portable energy storage device 50 may perform, by means of the electricity trading device 100, power transfer and electricity coin transaction.

Further, the transaction circuit 20 at least comprises a processing unit 21, a memory unit 22, a communication transmission unit 23, a display unit 24, a power management unit 25, an electrical connection port 26, and a near field sensing unit 27. The processing unit 21 is operable to execute a built-in program and processes all sorts of data. The memory unit 22 is in connection with the processing unit 21 and is built therein with at least one transaction program 220 and is loaded with various items of transaction data. The communication transmission unit 23 is in connection with the processing unit 21 and is connectable, by means of wireless technology or wired technology, with an external transaction management server device 60 for transmission of the various items of transaction data in a connected online manner. The transaction program 220 comprises functions of management and operation/transfer of electricity and selection of transaction modes. The display unit 24 is in connection with the processing unit 21 and is provided on an outer surface of the device body 10 to display the functions and data of the transaction program 220 and electricity amount. Further, the display unit 24 may include a touch control operation for providing a function of operating the transaction program 220. Further, the power management unit 25 is in connection with the processing unit 21 and the display unit 24, and the power management unit 25 is connectable with at least one external primary battery 30 and at least one external loading 40. Also, the power management unit 25 is in connection with the electrical connection port 26 that is arranged in the insertion receptacle 15 of the device body 10, to allow for selective connection therewith by the portable energy storage device 50, so that the power management unit 25 is operable to manage transfer of electricity input/output toward the loading 40 by or between the primary battery 30 and the portable energy storage device 50. In this way, the portable energy storage device 50 can be considered a secondary battery. The near field sensing unit 27 is in connection with the processing unit 21 can be a sensing element of the near field communication (NFC) or Bluetooth technology and can be used for mutual sensing/detection with respect to the portable energy storage device 50 to conduct a transaction transfer of electricity coin. According to some embodiments, the power management unit 25 may be further connection, by means of a boost/buck conversion circuit 28, to at least one charging/discharging port 280 arranged outside the device body 10. The charging/discharging port 280 can be a universal series bus (USB) charging/discharging port for external charging/discharging, such as charging of a mobile phone or a navigation device. Further, according to some embodiments, the processing unit 21 may be further connected with at least operation button 29 arranged outside the device body 10 for selection and setting of functions. Further, according to some embodiments, the processing unit 21 may be further connected with a data conversion computation unit 90, and the data conversion computation unit 90 comprises a global positioning unit 91 (such as a global positioning system (GPS)) and a mileage conversion unit 92 for computation of electricity consumption and travel distance, so that the electricity trading device 100 may proceed with calculation of valuable properties, such as digital points, virtual currency, and carbon credit that are considered equivalent to cash, for conducting transaction.

As such, an electricity trading device that is capable of electricity transfer and is also capable of trading and transmission is established and provided.

Figure 3:
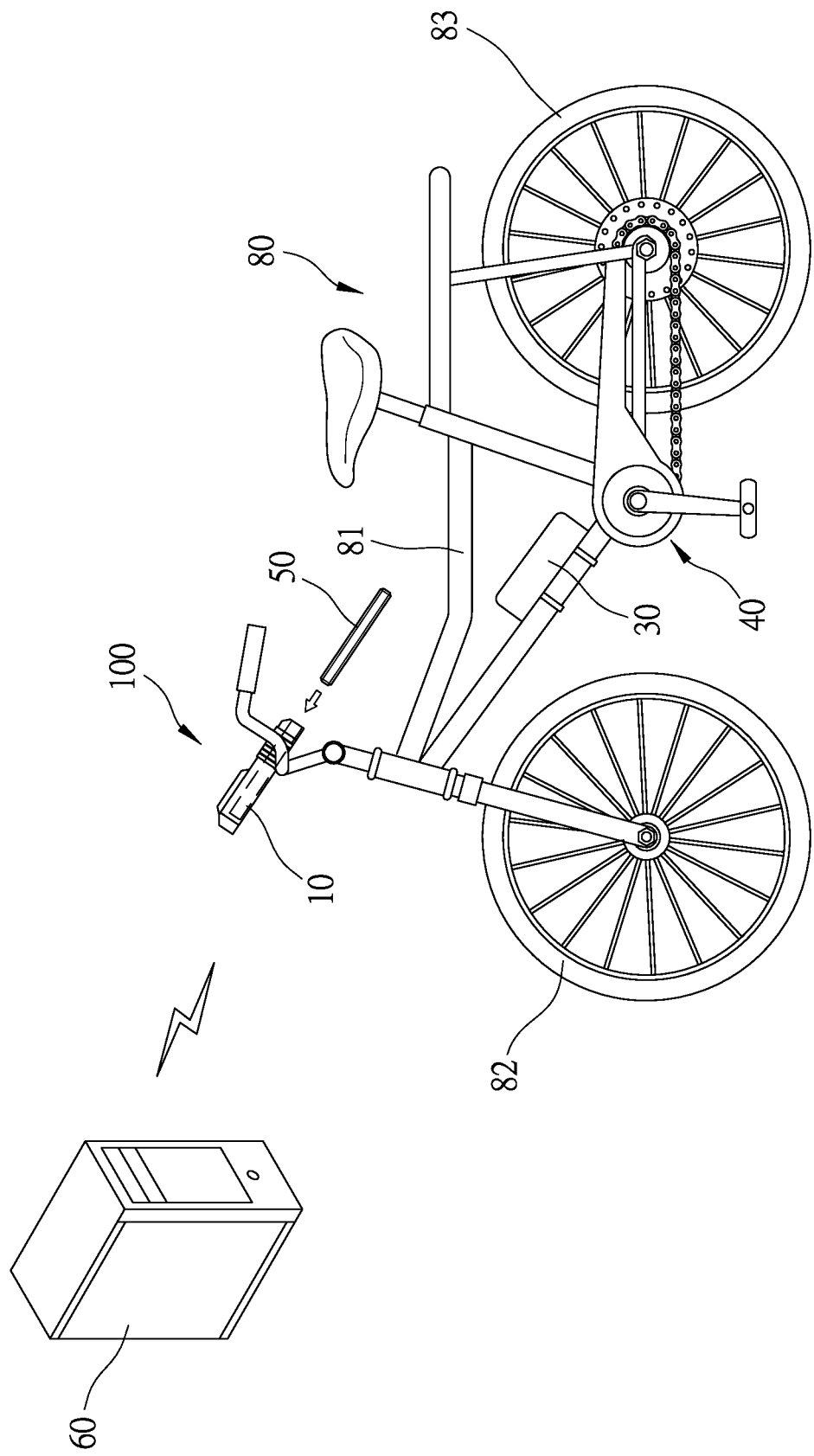
FIG. 3 is a schematic view showing the electricity trading device according to the present invention used in an electrical bicycle of an electrically-operated apparatus involving.
Figure 4:
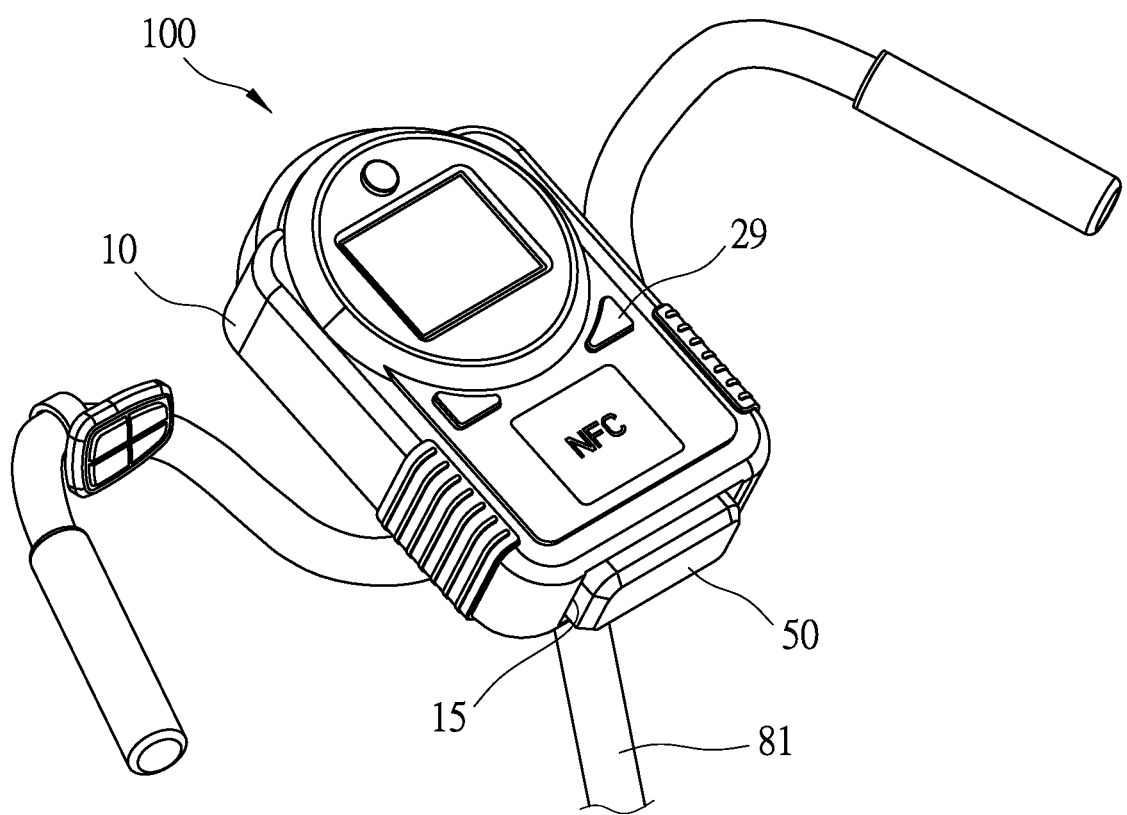
FIG. 4 is a schematic view showing, in an enlarged form, the electricity trading device according to the present invention used in an electrical bicycle of an electrically-operated apparatus.
Figure 5:
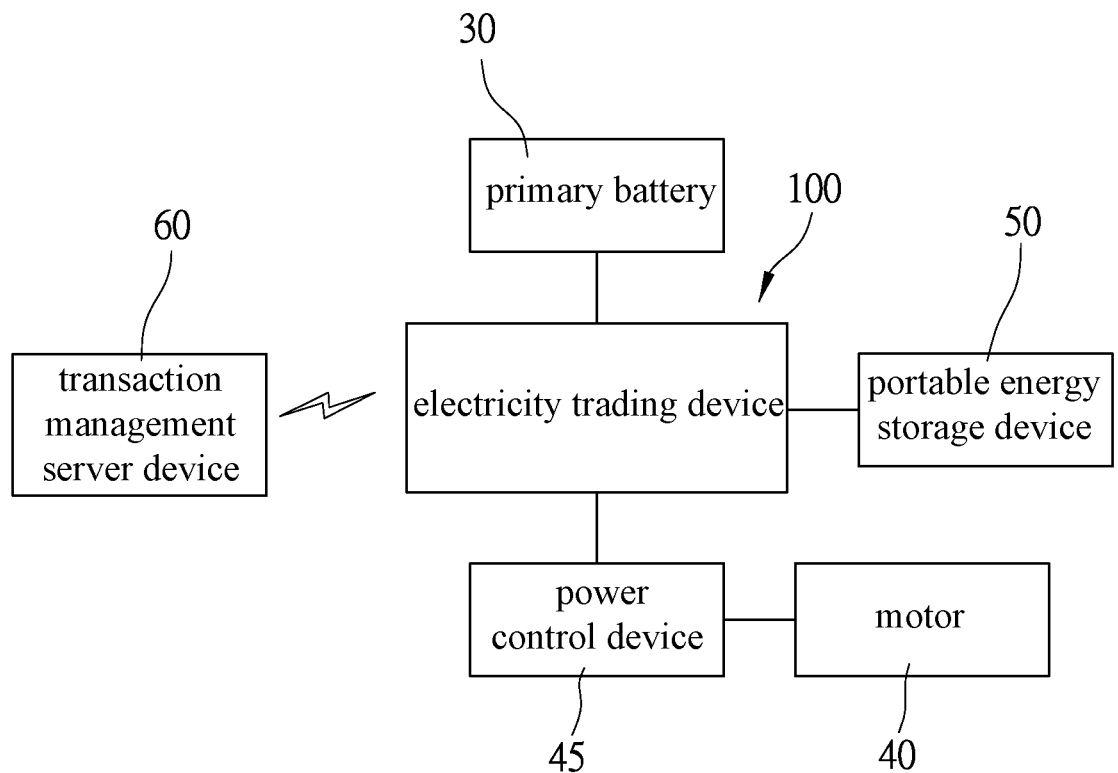
FIG. 5 is a schematic view showing system architecture of the electricity trading device according to the present invention used in an electricity bicycle of an electrically-operated apparatus.

The electricity trading device 100 according to the present invention is applicable to a general electrically-operated apparatus, as shown in FIGS. 3, 4, and 5. The electricity trading device 100 is usable in an electrical vehicle 80, and a frame 81 of the electrical vehicle 80 is provided, at a front end and a rear end thereof, with a front wheel 82 and a rear wheel 83, respectively. The electrical vehicle 80 may include a primary battery 30 in connection with a loading 40, such as a motor, which includes a power control device 45, so that the primary battery 30 supplies electricity to the loading 40, such as the motor, to drive the electrical vehicle 80. The electrical vehicle 80 is provided with the electricity trading device 100 according to the present invention that is mounted to a handlebar. The electricity trading device 100 is connected to the primary battery 30 and the loading 40, and the electricity trading device 100 uses the communication transmission unit 23 of the transaction circuit 20 to establish online connection with a transaction management server device 60 at a remote site, and the insertion receptacle 15 of the device body 10 of the electricity trading device 100 may receive a portable energy storage device 50 to selectively insert therein and electrical connection can be established through the electrical connection port 26 of the transaction circuit 20.

The portable energy storage device 50 may store a specific amount or capacity of electricity or electrical power. Further, the portable energy storage device 50 may convert or transfer a residual or left amount of the electricity capacity into a virtual capacity-electricity coin. Further, the portable energy storage device 50 may accumulate, after using the capacity-electricity coin, and generate a virtual usable electricity coin, so that the portable energy storage device 50 may use the electricity capacity, the capacity-electricity coin, and the usable electricity coin to conduct power transfer and electricity coin transaction with respect to the electricity trading device 100.

In operation, a user, with an attempt to operate the electrical vehicle 80, inserts the portable energy storage device 50 that is individually owned into the insertion receptacle 15 of the device body 10 of the electricity trading device 100, so that the portable energy storage device 50 establishes electrical connection with the transaction circuit 20 by means of the electrical connection port 26. Further, the electricity trading device 100 uses the near field sensing unit 27 of the transaction circuit 20 to sense and detect available data of electricity capacity, capacity-electricity coin, and usable electricity coin recorded in the portable energy storage device 50, so that the electricity trading device 100 display such data and the available electricity capacity of the primary battery 30 on the display unit 24. Further, the electricity trading device 100 uses the communication transmission unit 23 to connect the transaction management server device 60 at a remote site to conduct registration, verification, and data recording of the user data and device to allow for reading and selection of transaction mode by the user.

Illustrative example 1 illustrates riding by using personally owned portable energy storage device 50.

In case that electricity trading device 100 displays that the portable energy storage device 50 owned by the user has an available electricity capacity of 100000 mAh (which indicates, for example, the capacity-electricity coin is 100 PD if 1000 mAh is considered equivalent to 1 PD capacity-electricity coin) and a usable electricity coin of 1200 PD, the user may use the transaction program 220 displayed on the display unit 24 of the electricity trading device 100 to select using the portable energy storage device 50 to do riding. As such, the electricity trading device 100 uses the near field sensing unit 27 to deduct a usable electricity coin (such as 200 PD) from the portable energy storage device 50 to serve as a charge for renting the electrical vehicle 80. The electricity trading device 100 may use the power management unit 25 of the transaction circuit 20 to switch to the portable energy storage device 50 for supply of electricity required for the loading 40, so that there is no need to consume electricity from the primary battery 30 of the electrical vehicle 80, thereby reducing the frequency of charging and the number of removal/insertion of the primary battery 30 so as to reduce the chance of damage of the primary battery 30 and thus effectively protecting the primary battery 30 to therefore extending the service life of the primary battery 30.

Illustrative example 2 illustrates selling electricity from personally owned portable energy storage device 50 to electrical vehicle 80.

In operation, in case that the portable energy storage device 50 owned by the user has a sufficient amount of electricity, while the primary battery 30 of the electrical vehicle 80 has a demand for electricity supply, the user may use the transaction program 220 displayed by the display unit 24 of the electricity trading device 100 to select selling electricity, and as such, the electricity trading device 100 may use the power management unit 25 of the transaction circuit 20 to transfer electricity from the portable energy storage device 50 to the primary battery 30, and the amount of electricity so transferred is converted, through calculation, into a usable electricity coin, and such a value can be added, by means of the near field sensing unit 27, to the usable electricity coin of the portable energy storage device 50. For example, electricity of an amount of 800000 mAh is transferred out of the portable energy storage device 50, and consequently, the portable energy storage device 50 acquires an added value of 800 PD for the electricity coin thereof. In this way, the number of removal/insertion operations of the primary battery 30 for charging can be reduced and the chance of damage of the primary battery 30 is lowed, to thereby extend the service life of the primary battery 30 and also achieve an effect of trading of electricity, allowing an individual to conduct transaction of electricity and thus prompting development of green energy, realizing electricity-sharing economy.

Illustrative example 3 illustrates selecting purchase of electricity from the primary battery 30 for riding.

In case that the electricity trading device 100 displays the portable energy storage device 50 owned by the user has an available electricity capacity of 1000 mAh and a usable electricity coin of 1100 PD, the residual amount of electricity capacity is insufficient for riding of the electrical vehicle 80. The user may use the transaction program 220 displayed by the display unit 24 of the electricity trading device 100 to select using the primary battery 30 to do riding. As such, the electricity trading device 100 may use the near field sensing unit 27 to deduct a usable electricity coin (such as 200 PD) from the portable energy storage device 50 to serve as a charging for renting the electrical vehicle 80, and also, the electricity trading device 100 uses the power management unit 25 of the transaction circuit 20 to switch to the primary battery 30 to supply electricity to the loading 40, and meanwhile deducting a corresponding amount of usable electricity coin of consuming the electricity capacity of the primary battery 30 to achieve an effect of electricity trading, realizing electricity-sharing economy.

Based on the above description, it can be appreciated that the electricity trading device 100 according to the present invention uses the power management unit 25 of the transaction circuit 20 and the transaction program 220 loaded in the memory unit 22, in combination with the portable energy storage device 50, to reduce the frequency of charging and the number of removal/insertion operations of the primary battery 30 to effectively reduce the chance of damage of the primary battery 30 and thus effectively protect the primary battery 30, to thereby extend the service life of the primary battery 30, and also allowing individual entities to conduct transaction with electricity for prospering the green energy industry and allowing the green energy to be used by all the people for creating sharing economy for the electricity market, to thereby resolve the issue of energy shortage and to further enhance economy to increase the added value of products and enhance economic effectiveness thereof.

I claim:

1. An electricity trading device, which is connectable with a portable energy storage device and a primary battery for conducting power transfer and transaction, the electricity trading device at least comprising:
   a device body, which comprises an insertion receptacle adapted to receive selective insertion of the portable energy storage device therein;
   a transaction circuit, which at least comprises a processing unit, the processing unit being in connection with a memory unit that is built therein with at least one transaction program, the processing unit being also in connection with a communication transmission unit that is connectable with an external network, the processing unit being further in connection with a display unit, the processing unit being in connection with a power management unit, wherein the power management unit is operable to establish electrical connection with the primary battery, and the power management unit is in connection with an electrical connection port, the electrical connection port being selectively connectable with the portable energy storage device, the processing unit being in connection with a near field sensing unit,
   wherein the electrical connection port and the primary battery are separate from each other and the portable energy storage device that is in connection with the electrical connection port and the primary battery are separate from each other and are separately connected to the power management unit and wherein the power management unit is operable to switchably receive electrical power from the portable energy storage device and the primary battery for supplying such electrical power to a load and to selectively transfer electrical power between the portable energy storage device and the primary battery.

2. The electricity trading device according to claim 1, wherein the near field sensing unit comprises near field communication (NFC), and the portable energy storage device comprises a corresponding near field sensing unit to enable mutual wireless communication therebetween.

3. The electricity trading device according to claim 1, wherein the near field sensing unit comprises Bluetooth, and the portable energy storage device comprises a corresponding near field sensing unit to enable mutual wireless communication therebetween.

4. The electricity trading device according to claim 1, wherein the near field sensing unit is set in a wire-connected form, and the portable energy storage device comprises a corresponding near field sensing unit to enable mutual wired communication therebetween.

5. The electricity trading device according to claim 1, wherein the power management unit is connectable, by means of a boost/buck conversion circuit, with at least a charging/discharging port arranged outside the device body and adapted to selectively connect with a separate power-consuming/power-supplying device to selectively supply/receive electrical power to/from the external power-consuming/power-supplying device for charging/discharging of the external power-consuming/power-supplying device.

6. The electricity trading device according to claim 1, wherein the processing unit is further in connection with at least an operation button that is arranged outside the device body for selection and setting of functions.

7. The electricity trading device according to claim 1, wherein the processing unit is further in connection with a data conversion computation unit, and the data conversion computation unit comprises a global positioning unit and a mileage conversion unit.

8. An electrically-operated apparatus, the electrically-operated apparatus being provided with the electricity trading device according to claim 1, wherein the power management unit of the electricity trading device is connected to a loading that drives the electrically-operated apparatus, and the primary battery of the electrically-operated apparatus is connected to the power management unit.

9. The electrically-operated apparatus according to claim 8, wherein the loading comprises a motor, and a power control device is arranged between the motor and the electricity trading device.

* * * * *